United States Patent
Noguchi et al.

(10) Patent No.: US 11,401,423 B2
(45) Date of Patent: Aug. 2, 2022

(54) SURFACE TREATED-METAL OXIDE PARTICLE MATERIAL, METHOD FOR PRODUCING SAME, RESIN COMPOSITION FOR ELECTRONIC MATERIAL, AND FILLER FOR SILICONE RESIN MATERIAL

(71) Applicant: ADMATECHS CO., LTD., Miyoshi (JP)

(72) Inventors: Shingi Noguchi, Miyoshi (JP); Masaru Kuraki, Miyoshi (JP); Tempo Nakamura, Miyoshi (JP); Yoshinori Okawauchi, Miyoshi (JP)

(73) Assignee: ADMATECHS CO., LTD., Miyoshi (JP)

( * ) Notice: Subject to any disclaimer, the term of this patent is extended or adjusted under 35 U.S.C. 154(b) by 0 days.

(21) Appl. No.: 17/237,294

(22) Filed: Apr. 22, 2021

(65) Prior Publication Data

US 2021/0238421 A1  Aug. 5, 2021

Related U.S. Application Data

(63) Continuation of application No. PCT/JP2019/040921, filed on Oct. 17, 2019.

(30) Foreign Application Priority Data

Oct. 24, 2018 (JP) .............................. JP2018-200341

(51) Int. Cl.
  *C08K 3/013* (2018.01)
  *C08L 83/06* (2006.01)
  *C08K 3/22* (2006.01)

(52) U.S. Cl.
  CPC .............. *C08L 83/06* (2013.01); *C08K 3/013* (2018.01); *C08K 3/22* (2013.01); *C08K 2003/2227* (2013.01)

(58) Field of Classification Search
  CPC ......... C08L 83/06; C08L 83/14; C08K 3/013; C08K 3/22; C08K 2003/2227; C08K 13/08; C08K 9/04; C08K 9/06
  See application file for complete search history.

(56) References Cited

U.S. PATENT DOCUMENTS

| | | | | |
|---|---|---|---|---|
| 4,062,693 A * | 12/1977 | Berger | ...................... | C08K 9/06 106/481 |
| 6,380,301 B1 * | 4/2002 | Enami | ...................... | C08K 9/06 524/588 |
| 8,633,276 B2 * | 1/2014 | Domae | ................... | C08L 83/04 524/588 |
| 9,481,818 B2 | 11/2016 | Matsumoto | | |
| 9,845,391 B2 * | 12/2017 | Lehmann | ................... | C09C 3/12 |
| 9,856,361 B2 * | 1/2018 | Otsuka | ...................... | C09D 7/62 |
| 10,647,830 B2 | 5/2020 | Ito | | |
| 2006/0204528 A1 * | 9/2006 | Nolte | ......................... | C09C 3/12 424/401 |
| 2010/0213415 A1 | 8/2010 | Fujii et al. | | |
| 2015/0021643 A1 * | 1/2015 | Kurino | ................... | C01G 25/02 257/98 |
| 2016/0096984 A1 | 4/2016 | Matsumoto | | |
| 2019/0161666 A1 | 5/2019 | Tanigawa et al. | | |
| 2019/0292349 A1 | 9/2019 | Ito | | |

FOREIGN PATENT DOCUMENTS

| | | |
|---|---|---|
| EP | 3372630 A1 | 9/2018 |
| JP | 2011021192 A | 2/2011 |
| JP | 2014218564 A | 11/2014 |
| JP | 10-20160006689 A | 1/2016 |
| JP | 2017105659 A | 6/2017 |
| JP | 2017210518 A | 11/2017 |
| JP | 10-20180079355 A | 7/2018 |
| JP | 6603777 B1 | 11/2019 |

OTHER PUBLICATIONS

Decision to Grant dated Sep. 17, 2019 in Japanese Patent Application No. 2018-200341 (with Euglish translation), 4 pages.
International Search Report dated Dec. 10, 2019 in PCT/JP2019/040921 (with English translation), 5 pages.
Office Action dated Jan. 18, 2021 in Korean Patent Application No. 10-2020-7034319 (with English translation), 13 pages.
Office Action dated Jan. 8, 2019 in Japanese Patent Application No. 2018-200341 (with English translation), 5 pages.
Office Action dated May 28, 2019 in Japanese Patent Application No. 2018-200341 (with English translation), 7 pages.
Written Opinion dated Dec. 10, 2019 in PCT/JP2019/040921 (with English translation), 6 pages.
Extended European Search Report dated Nov. 9, 2021 in Patent Application No. 19876447.4, 7 pages.

\* cited by examiner

*Primary Examiner* — Jane L Stanley
(74) *Attorney, Agent, or Firm* — Element IP, PLC

(57) ABSTRACT

Provided is a filler that has a low viscosity when mixed in a resin material and has reduced permittivity and dielectric loss tangent. The filler includes: a metal oxide particle material; and a polyorganosiloxane compound with which a surface treatment is performed on the metal oxide particle material and which is represented by general formula (1): $(RO)_3Si-(SiR_2-O-)_n-SiR_3$ (in general formula (1), each R is independently selected from among alkyl groups having 1 to 4 carbon atoms, and n is not less than 10 and not greater than 200). A resin composition obtained by containing the filler in a resin is suitable for an electronic material.

18 Claims, 8 Drawing Sheets

SURFACE TREATED-METAL OXIDE PARTICLE MATERIAL, METHOD FOR PRODUCING SAME, RESIN COMPOSITION FOR ELECTRONIC MATERIAL, AND FILLER FOR SILICONE RESIN MATERIAL

TECHNICAL FIELD

The present invention relates to a surface treated-metal oxide particle material, a production method therefor, a resin composition for an electronic material, and a filler for a silicone resin material.

BACKGROUND ART

A resin composition containing inorganic particles as a filler in a resin material in order to improve physical properties and thermal properties is widely used for electronic substrates and semiconductor sealing materials. In particular, a thermal conductive material (TIM), which is adopted focusing on thermal properties and is used when fixing a heat sink or the like to a semiconductor element, is known (Patent Literature 1 or the like).

In order to improve the physical properties and thermal properties of the resin composition, increasing the contained amount of the filler is required, but there is a limit to the amount of the filler to be mixed in the resin material. In order to contain a large amount of the filler in the resin material, the viscosity when the filler is contained in the resin material needs to be kept low.

Conventionally, various surface treatments have been performed on the filler in order to reduce the viscosity when the filler is contained in the resin material.

CITATION LIST

Patent Literature

Patent Literature 1: JP 2017-210518 (A)

SUMMARY OF INVENTION

Technical Problem

Meanwhile, an increasing number of electronic materials and electronic components to which the resin composition is applied are used in high-frequency circuits. When the resin composition is used in a high-frequency circuit, the resin composition is required to have reduced permittivity and dielectric loss tangent.

The present invention has been completed in view of these circumstances, and a problem addressed by the present invention is to provide a surface treated-metal oxide particle material expected to be applied to a filler or the like that has a low viscosity when mixed in a resin material and has reduced permittivity and dielectric loss tangent, a production method therefor, a resin composition for an electronic material in which the surface treated-metal oxide particle material is adopted as a filler, and a filler for a silicone resin material.

Solution to Problem

As a result of thorough investigation by the present inventors for solving the above problem, the present inventors have obtained the findings that a metal oxide particle material subjected to a surface treatment with a polyorganosiloxane compound represented by general formula (1): $(RO)_3SiO-(SiR_2-O-)_n-SiR_3$ (in general formula (1), each R is independently selected from among alkyl groups having 1 to 4 carbon atoms, and n is not less than 10 and not greater than 200) has a low viscosity in a resin material and has reduced permittivity and dielectric loss tangent. The present inventors have completed the present invention on the basis of said findings.

(1) A surface treated-metal oxide particle material solving the above-described problem includes: a metal oxide particle material; and a polyorganosiloxane compound with which a surface treatment is performed on the metal oxide particle material and which is represented by general formula (1): $(RO)_3SiO-(SiR_2-O-)_n-SiR_3$ (in general formula (1), each R is independently selected from among alkyl groups having 1 to 4 carbon atoms, and n is not less than 10 and not greater than 200).

In particular, preferably, the metal oxide particle material has a volume average particle diameter of not less than 0.1 μm and not greater than 200 μm, and an amount of the polyorganosiloxane compound is not less than 0.05% and not greater than 3.0% based on a mass of the metal oxide particle material.

Moreover, the surface treated-metal oxide particle material may be further subjected to a surface treatment with a second surface treatment agent composed of an organosilazane or a silane compound having a vinyl group or an alkyl group having 1 to 3 carbon atoms.

(2) A production method for a surface treated-metal oxide particle material according to the present invention solving the above-described problem includes: a mixing step of obtaining a mixture by mixing, with a metal oxide particle material having a volume average particle diameter of not less than 0.1 μm and not greater than 200 μm, not less than 0.05% and not greater than 3.0% of a polyorganosiloxane compound based on a mass of the metal oxide particle material, the polyorganosiloxane compound being represented by general formula (1): $(RO)_3SiO-(SiR_2-O-)_n-SiR_3$ (in general formula (1), each R is independently selected from among alkyl groups having 1 to 4 carbon atoms, and n is not less than 10 and not greater than 200); and a surface treatment step of maintaining the mixture at a temperature of not lower than 5° C. and not higher than 100° C. for a time of not shorter than 1 hour and not longer than 168 hours to cause a reaction.

Moreover, the production method may include a second surface treatment step of performing a surface treatment with an organosilazane or a silane compound having a vinyl group or an alkyl group having 1 to 3 carbon atoms.

(3) A resin composition for an electronic material according to the present invention solving the above-described problem includes: the above-described surface treated-metal oxide particle material according to the present invention; and a silicone resin material in which the surface treated-metal oxide particle material is dispersed.

Advantageous Effects of Invention

Since the surface treated-metal oxide particle material according to the present invention has the above-described configuration, the viscosity of a resin composition obtained by containing the surface treated-metal oxide particle material in a resin material is reduced, and the permittivity and the dielectric loss tangent of the resin composition are reduced.

DESCRIPTION OF EMBODIMENTS

Figure 1:
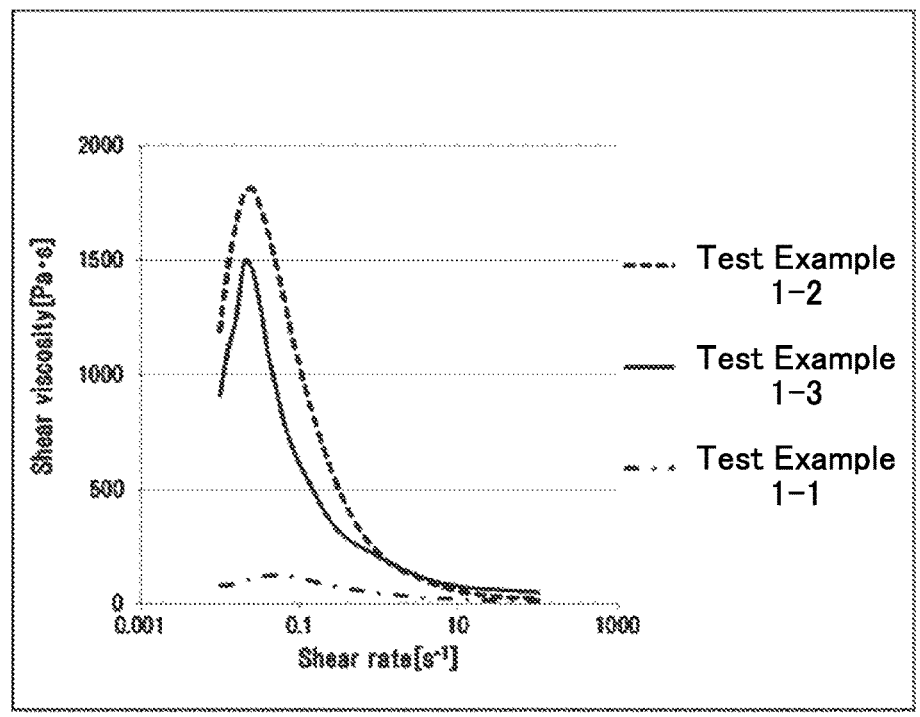
FIG. 1 is a graph showing the shear rate dependence of the viscosity of each test sample in Examples.

The surface treated-metal oxide particle material, the production method therefor, and the resin composition for an electronic material according to the present invention are described in detail below based on an embodiment.

(Surface Treated-Metal Oxide Particle Material)

A surface treated-metal oxide particle material according to the present embodiment has a metal oxide particle material and a polyorganosiloxane compound. The polyorganosiloxane compound is a compound that acts on the surface of the metal oxide particle material to perform a surface treatment thereon.

The metal oxide particle material is a particle material composed of a metal oxide. The metal oxide is not particularly limited, and examples thereof include alumina, silica, zirconia, magnesia, titania, zinc oxide, iron oxide, a composite oxide containing a plurality of metals, and a mixture of a plurality of types of metal oxides. Alumina is particularly preferable from the viewpoint of high thermal conductivity and high physical and chemical stability.

The metal oxide particle material preferably has a volume average particle diameter of not less than 10 µm. In particular, the volume average particle diameter is preferably not less than 45 µm, not less than 70 µm, and not less than 100 µm. Furthermore, preferably, particles having a particle diameter that is equal to or less than half the volume average particle diameter are not contained. For a thick-film TIM, a larger particle diameter is preferable from the viewpoint of improving thermal conductivity since the contact thermal resistance due to the interface between different materials is reduced. The volume average particle diameter may be measured by a laser diffraction/scattering method.

The metal oxide particle material preferably has a volume average particle diameter of not greater than 30 µm. In particular, the volume average particle diameter is preferably not greater than 10 µm, not greater than 3 µm, and not greater than 0.2 µm. Furthermore, preferably, particles (coarse particles) having a particle diameter that is equal to or greater than twice the volume average particle diameter are not contained. The sizes of electronic materials and electronic components and the widths of internal wirings thereof have become smaller, and thus the volume average particle diameter is required to be smaller in order to adopt the metal oxide particle material for the electronic materials and the electronic components. For the surface treated-metal oxide particle material according to the present embodiment, a particle size distribution may be determined by arbitrarily combining the upper limit and the lower limit of the particle diameter.

The polyorganosiloxane compound is the compound represented by the above general formula (1). As for each R, the number of carbon atoms is preferably not greater than 3, more preferably 1 or 2, and most preferably 1. n is preferably greater than 10, more preferably not less than 30, and further preferably not less than 60. The polyorganosiloxane compound may be a mixture of compounds having different values of n. Examples of the upper limit of the value of n include 200 and 100.

The amount of the polyorganosiloxane compound is preferably not less than 0.05% and not greater than 3.0% based on the mass of the metal oxide particle material. Examples of the lower limit include 0.05% and 0.10%. A sufficient viscosity decrease effect is exhibited by treating the surface of the metal oxide particle material with an amount not less than these amounts. Examples of the upper limit include 2.0%, 2.5%, and 3.0%. The surface of the metal oxide particle material is sufficiently treated with an amount not greater than these amounts.

Since the polyorganosiloxane compound reacts with the reactive functional groups (for example, OH groups) existing on the surface of the metal oxide particle material, the polyorganosiloxane compound is caused to react with all the reactive functional groups by treating the metal oxide particle material with an amount corresponding to the amount of the reactive functional groups. An excessive amount of the polyorganosiloxane compound physically adheres to the surface of the metal oxide particle material. Thus, the amount of the polyorganosiloxane compound is determined simply based on the mass of the metal oxide particle material, and is also determined so as to correspond to the amount of the reactive functional groups existing on the surface of the metal oxide particle material.

As the amount corresponding to the reactive functional groups, an amount that allows reaction with all the reactive functional groups and an amount that allows reaction with 90% or 80% of the reactive functional groups may be selected. By causing the reactive functional groups to remain, a surface treatment may be subsequently performed with another surface treatment agent for another purpose. For example, in order to improve hydrophobicity, a treatment may be performed with an organosilazane such as hexamethyldisilazane, or a surface treatment may be performed with a second surface treatment agent composed of a silane compound having a vinyl group or an alkyl group (may be performed before or after the surface treatment with the organosiloxane compound). Furthermore, a surface treatment may also be performed with the polyorganosiloxane compound in an amount that exceeds the amount corresponding to the reactive functional groups.

(Production Method for Surface Treated-Metal Oxide Particle Material)

A production method for the surface treated-metal oxide particle material according to the present embodiment has a mixing step and a surface treatment step.

The mixing step is a step of mixing a metal oxide particle material and a polyorganosiloxane compound. As for the mixing ratio, the above-described ratio may be adopted, and thus the description thereof is omitted. The metal oxide particle material is the same as the metal oxide particle material described above for the surface treated-metal oxide particle material, except that the volume average particle diameter is limited.

A drying step may be performed on the metal oxide particle material before the metal oxide particle material is subjected to the mixing step. The drying step is a step of removing the existing polar solvent such as water, and is not particularly limited. Examples of the drying step include a heating step (temperatures such as normal temperature (25° C.) or higher, 50° C., 75° C., 100° C., 125° C., 150° C., 200° C., and 300° C. may be adopted), a pressure reducing step, a step of immersion in a non-polar solvent and then drying, and a combination thereof. The polyorganosiloxane compound also preferably undergoes a step of reducing a polar solvent such as water. The polyorganosiloxane compound is as described above.

The mixing step is a step of bringing the polyorganosiloxane compound into contact with the surface of the metal oxide particle material. Since a surface treatment of the metal oxide particle material proceeds during mixing, the mixing step and the surface treatment step are speculated to be performed in parallel. A step in which the polyorganosiloxane compound is brought into contact with the surface of the metal oxide particle material as uniformly as possible is preferably adopted.

For example, the metal oxide particle material and the polyorganosiloxane compound are uniformly mixed by stirring after being mixed. Furthermore, the metal oxide particle material and the polyorganosiloxane compound are further uniformly mixed by mixing in a state where the polyorganosiloxane compound is dispersed in an appropriate solvent. As the appropriate solvent, non-polar solvents such as hexane, heptane, THF (tetrahydrofuran), toluene, and xylene may be adopted.

The polyorganosiloxane compound may be mixed little by little. In this case, the reaction is caused to proceed while mixing. In addition, the polyorganosiloxane compound may be mixed in the entire addition amount at one time, mixed little by little, or divided into two or more portions and mixed sequentially.

The surface treatment step is a step of maintaining the mixture obtained in the mixing step at a temperature of not lower than 5° C. and not higher than 100° C. for a time of not shorter than 1 hour and not longer than 168 hours to cause a reaction. The reaction described herein means that the functional groups of the polyorganosiloxane compound of general formula (1) react with the functional groups (reactive functional groups) on the surface of the metal oxide particle material. Since the reaction in the surface treatment step may also proceed in the above-described mixing step, the surface treatment step and the mixing step may proceed at the same time.

The temperature at which the surface treatment step is performed is not particularly limited, and 20° C., 30° C., 40° C., 50° C., 60° C., 70° C., 80° C., 90° C., 100° C., and the like may be adopted as the lower limit thereof. The surface treatment is caused to immediately proceed by increasing the temperature. The upper limit of the temperature is also not particularly limited, and 20° C., 30° C., 40° C., 50° C., 60° C., 70° C., 80° C., 90° C., and 100° C., which are the same as for the lower limit, may be adopted. A preferable range of the combination of the upper limit and the lower limit of the temperature depends on factors such as the allowable surface treatment time, the required surface treatment time, and the allowable heating cost, and the upper limit and the lower limit may be arbitrarily combined and set.

Furthermore, the surface treatment step does not have to be completed at once, and the reaction may be completed in two or more steps. For example, after a condition that a part of the mixed polyorganosiloxane compound reacts is adopted, another step may be performed, and the remaining polyorganosiloxane compound may be then caused to react. In addition, in the case where the polyorganosiloxane compound is not mixed all at once, the surface treatment step may be performed every time a small amount of the polyorganosiloxane compound is mixed. Moreover, the surface treatment step may be performed simultaneously with a later-described second surface treatment step.

The second surface treatment step is a step of performing a surface treatment on the metal oxide particle material with a second surface treatment agent. The surface treatment with the second surface treatment agent may be performed independently after the above-described mixing step and surface treatment step are completed, or may be performed at any time between before the mixing step and the completion of the surface treatment step. For example, the second surface treatment agent is a compound capable of also reacting with the reactive functional groups existing on the surface of the metal oxide particle material, and strong bonds are formed on the surface of the metal oxide particle material by performing the surface treatment before the polyorganosiloxane compound reacts.

For example, the second surface treatment step may be performed after the polyorganosiloxane compound is caused to react with all the reactive functional groups on the surface of the metal oxide particle material, may be performed after the polyorganosiloxane compound is caused to react with a part of the reactive functional groups on the surface of the metal oxide particle material, or may be performed before a surface treatment is performed with the polyorganosiloxane compound. Moreover, when the surface treatment step is performed, the second surface treatment step may be performed after the surface treatment step is interrupted in the middle, and then the surface treatment step may be restarted.

The second surface treatment agent is an organosilazane or a silane compound having a vinyl group or an alkyl group having 1 to 3 carbon atoms. An example of the organosilazane is hexamethyldisilazane.

(Resin Composition for Electronic Material)

A resin material for an electronic material according to the present embodiment has the above-described surface treated-metal oxide particle material according to the present embodiment, and a resin material. The resin composition for an electronic material according to the present embodiment may be used for substrates on which electronic components are disposed, sealing materials for semiconductors, heat transfer materials for connecting a semiconductor element and a heat sink, etc.

The mixing ratio of the surface treated-metal oxide particle material and the resin material is not particularly limited, but the amount of the surface treated-metal oxide particle material is preferably larger. The mixing amount of the surface treated-metal oxide particle material is preferably determined on the basis of the viscosity of the obtained resin composition for an electronic material. As the viscosity becomes lower, fine gaps and the like are more sufficiently filled. Thus, the mixing amount is preferably determined such that a viscosity not greater than the required viscosity is exhibited.

The resin material is not particularly limited, but a silicone resin is preferably contained. As the silicone resin, resins having various polymerization degrees may be adopted, and resins in the liquid form, resins in the solid form, resins that are solidified by reaction, and the like may be adopted.

EXAMPLES

The surface treated-metal oxide particle material, the production method therefor, and the resin composition for an electronic material according to the present invention are described below based on Examples.

(Test 1: Confirmation of Effect of Polyorganosiloxane Compound)

Test Example 1-1

A resin composition was prepared as a test sample of this test example by dispersing 85 parts by mass of a surface treated-metal oxide particle material obtained by performing a surface treatment on alumina particles (manufactured by Admatechs Company Limited, AO-509, volume average particle diameter: 7 to 13 μm, specific surface area: 1.0 $cm^2/g$ to 1.8 $cm^2/g$) as a metal oxide particle material, in 15 parts by mass of a silicone resin (manufactured by Shin-Etsu Chemical Co., Ltd., KE-106: two-component RTV rubber) as a resin material.

The surface treatment of the metal oxide particle material was performed with 0.5% of the polyorganosiloxane compound of general formula (1) (each R is a methyl group, and n is 30) based on the mass of the metal oxide particle material. The surface treatment was performed by mixing the metal oxide particle material and the polyorganosiloxane compound, then heating the mixture at 60° C. for 8 hours, and then allowing the mixture to stand for 12 hours. The mixing amount of the polyorganosiloxane compound is an amount that allows reaction with all the OH groups as the reactive functional groups existing on the surface of the metal oxide particle material.

Test Example 1-2

A resin composition was prepared as a test sample of this test example in the same manner as Test Example 1-1, except that the metal oxide particle material was used as it is without performing a surface treatment thereon.

Viscosity Measurement

The viscosities of the test samples of Test Examples 1-1 and 1-2 were measured. The viscosity measurement was performed using a rheometer "ARES G2" manufactured by TA Instruments. The resin composition was sandwiched between a stage having a diameter of 75 mm on the lower side and a parallel plate having a diameter of 25 mm on the upper side such that the resin composition had a specific thickness, the stage on the lower side was rotated, and the viscosity was measured in a shear rate range of 0.01 $s^{-1}$ to 100 $s^{-1}$.

Upon measurement of the viscosity properties, the thickness of the resin composition was set to 0.1 mm when a value that was 10 times the volume average particle diameter was not greater than 0.1 mm, and was set to a thickness equal to the value that was 10 times volume average particle diameter, when the value that was 10 times the volume average particle diameter was not less than 0.1 mm. FIG. 1 shows the results.

As is obvious from FIG. 1, the viscosity of Test Example 1-1 was found to be reduced to about ⅕ of the viscosity of Test Example 1-2.

Test Example 1-3

A resin composition was prepared as a test sample of this test example by mixing 90.5 parts by mass of the surface treated-metal oxide particle material and 9.5 parts by mass of the resin material in Test Example 1-1. The mixing ratio is a value set such that a viscosity (viscosity at a shear rate of 0.05 $s^{-1}$) similar to that of the test sample of Test Example 1-2 is exhibited. FIG. 1 also shows the results of the viscosity measurement of the test sample of Test Example 1-3. The viscosity of the test sample of Test Example 1-3 was similar to that of the test sample of Test Example 1-2 at a shear rate of 0.05 $s^{-1}$, but was lower than that of the test sample of Test Example 1-2 at shear rates lower than 0.05 $s^{-1}$ as a whole.

Thermal Conductivity Measurement

The thermal conductivities of the test samples of Test Examples 1-2 and 1-3 were measured. A cured product of each test sample was cut out into a test piece having a diameter of 20 mm and a height of 30 mm, and then the thermal conductivity measurement was performed by a hot disk method using "TPS 2500S" manufactured by Kyoto Electronics Manufacturing Co., Ltd. As a result, the thermal conductivity of Test Example 1-2 was 1.518 W/m·K (density of 2.69 $g/cm^3$: average value), and the thermal conductivity of Test Example 1-3 was 2.578 W/m·K (density of 2.92 $g/cm^3$: average value), so that the test sample of Test Example 1-3 in which the surface treated-metal oxide particle material was used was found to exhibit a thermal conductivity higher by 70% or more than that of the test sample of Test Example 1-2 in which the metal oxide particle material was used as it is. The reason for this is speculated to be that the viscosity decrease effect was high and a large amount of the surface treated-metal oxide particle material was contained.

(Test 2: Change of Viscosity by Mixing Amount of Polyorganosiloxane Compound)

Test Examples 2-1 to 2-3

A surface treated-metal oxide particle material was prepared by the same method as Test Example 1-1, except that AO-502 (manufactured by Admatechs Company Limited, alumina, volume average particle diameter: 0.2 to 0.3 μm, specific surface area: 6.5 to 9.0 $cm^2/g$) was used as the metal oxide particle material instead of AO-509, and the mixing amount of the polyorganosiloxane compound was set to 1.0% (Test Example 2-1), 1.5% (Test Example 2-2), and 2.5% (Test Example 2-3).

Resin compositions were obtained as test samples of these test examples by mixing 63.5 parts by mass of this surface treated-metal oxide particle material and 36.5 parts by mass of a resin material (KE-106).

Test Example 2-4

A resin composition was obtained as a test sample of this test example by mixing 63.5 parts by mass of the metal oxide particle material used in Test Example 2-1 and 36.5 parts by mass of the resin material.

Measurement of Viscosity

Figure 2:
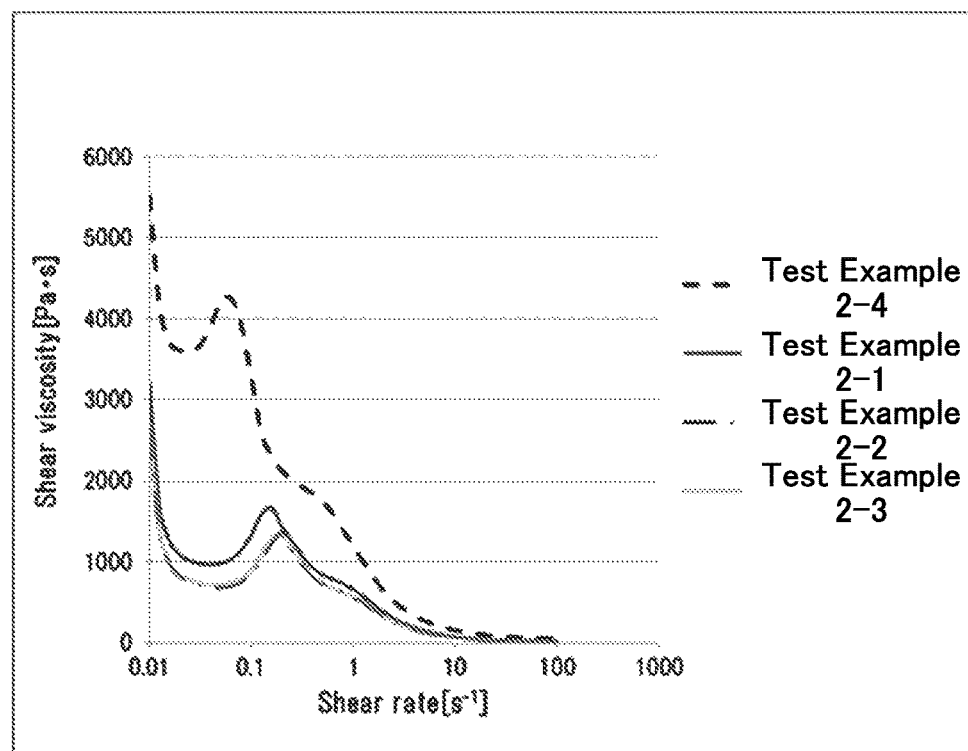
FIG. 2 is a graph showing the shear rate dependence of the viscosity of each test sample in Examples.

The viscosities of the test samples of Test Examples 2-1 to 2-4 were measured in the same manner as Test 1. FIG. 2 shows the results. As is obvious from FIG. 2, the viscosity was found to decrease as the amount of the polyorganosiloxane compound used in the surface treatment increased.

However, since the viscosities of the test samples of Test Examples 2-2 and 2-3 were substantially equal to each other, the amount of the polyorganosiloxane compound was speculated to be saturated at 1.5%.

Test Example 2-5

A resin composition was prepared as a test sample of this test example by mixing 76.9 parts by mass of the surface treated-metal oxide particle material and 23.1 parts by mass of the resin material in Test Example 2-2. The mixing ratio is a value set such that a viscosity (viscosity at a shear rate of 0.05 s$^{-1}$) similar to that of the test sample of Test Example 2-4 was exhibited.

Measurement of Thermal Conductivity

For each of the test samples of Test Examples 2-4 and 2-5, a test piece was prepared and the thermal conductivity was measured in the same manner as Test 1. As a result, the thermal conductivity of Test Example 2-4 was 0.521 W/m·K (density of 1.92 g/cm$^3$: average value), and the thermal conductivity of Test Example 2-5 was 0.756 W/m·K (density of 2.23 g/cm$^3$: average value), so that the test sample of Test Example 2-5 in which the surface treated-metal oxide particle material was used was found to exhibit a thermal conductivity higher by 45% or more than that of the test sample of Test Example 2-4 in which the metal oxide particle material was used as it is. The reason for this is speculated to be that the viscosity decrease effect was high and a large amount of the surface treated-metal oxide particle material was contained.

(Test 3: Examination of Chemical Structure of Polyorganosiloxane Compound)

Test Example 3-1

A test sample of this test example was obtained by mixing 85 parts by mass of a surface treated-metal oxide particle material obtained by preparing a surface treated-metal oxide particle material by the same method as Test Example 1-1 and 15 parts by mass of the resin material.

Test Example 3-2

A resin composition was prepared as a test sample of this test example in the same manner as Test Example 3-1, except that Me$_3$SiO—(SiMe$_2$-O)$_p$—(SiMeX—O)$_q$—(SiMe$_Y$-O)$_r$—SiMe$_3$ (wherein X is —R$^1$—(SiMe$_2$-O)$_a$—SiMe$_3$, Y is —R$^2$—Si(OEt)$_3$, R$^1$ and R$^2$ are each an alkylene group, and the molecular weight is about 5000) was used instead of the polyorganosiloxane compound.

Test Example 3-3

A resin composition was prepared as a test sample of this test example in the same manner as Test Example 3-1, except that (MeO)$_3$SiO—(SiMe(OMe)-O—SiMe(OMe))$_n$—O—Si(OMe)$_3$ (the molecular weight is about 2430) was used instead of the polyorganosiloxane compound.

Test Example 3-4

A resin composition was prepared as a test sample of this test example in the same manner as Test Example 3-1, except that the metal oxide particle material was used as it is instead of the surface treated-metal oxide particle material.

Viscosity Measurement and Evaluation of Thermal Stability

Figure 3:
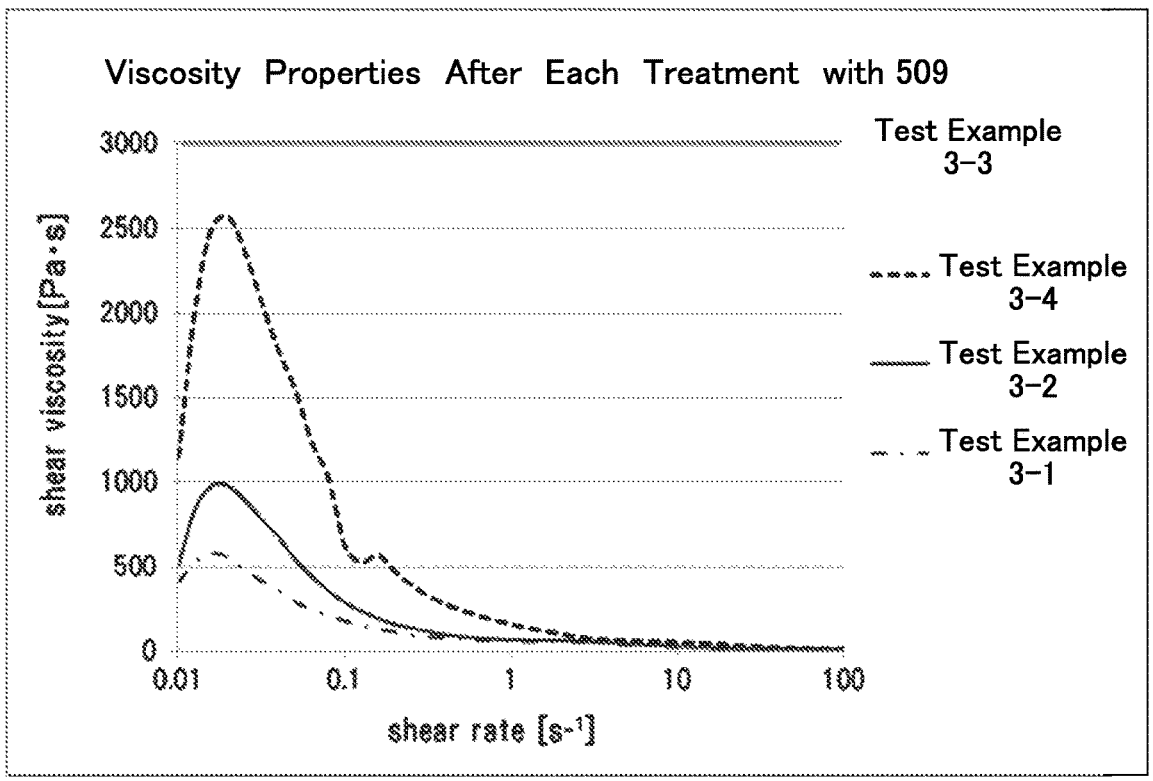
FIG. 3 is a graph showing the shear rate dependence of the viscosity of each test sample in Examples.

The viscosities of the test samples of Test Examples 3-1 to 3-4 were measured by the same method as Test 1. FIG. 3 shows the results. The viscosity of the test sample of Test Example 3-3 was very high and was not able to be measured. As is obvious from FIG. 3, the viscosities of Test Examples 3-1 and 3-2 were found to be significantly lower than that of Test Example 3-4 in which no surface treatment was performed.

The test samples of Test Examples 3-1 and 3-2 were evaluated for thermal stability. The evaluation of thermal stability was performed by determining the rate of decrease in the weight of the surface treatment agent when the temperature was increased from 25° C. to 250° C., using THERMO PLUS series TG-DTA TG8120 manufactured by Rigaku Corporation. The temperature increase rate was 5° C./min, and the temperature was kept at each of 100° C., 150° C., 200° C., and 250° C. for 1 hour. As a result, the weight of the surface treatment agent used in Test Example 3-1 was 14.660 mg at the start of measurement and was 13.752 mg after the end of measurement. Since the weight decreased by 0.90756 mg, the weight decrease rate is 6.2%. The weight of the surface treatment agent used in Test Example 3-2 was 18.490 mg at the start of measurement, and was 12.726 mg after the end of measurement. Since the weight decreased by 5.764 mg, the weight decrease rate is 31%. The surface treatment agent of Test Example 3-1 exhibits a weight decrease rate of 10% or less, so that the thermal stability thereof was found to be higher than that of the surface treatment agent of Test Example 3-2. Since the alkylene group exists in the main chain in the chemical structure of the surface treatment agent used in Test Example 3-2, the higher thermal stability is speculated to be due to this alkylene group being decomposed by heat.

(Test 4)

Particle materials composed of aluminum were adopted as a metal oxide particle material. Specifically, particle materials having volume average particle diameters of 3 µm, 10 µm, 70 µm, and 100 µm were adopted. On these metal oxide particle materials, a surface treatment was performed with various mixing amounts of a polyorganosiloxane compound (compound in Test Example 1-1), and the viscosities of resin compositions obtained by mixing these metal oxide particle materials and the resin material at respective ratios were measured by the method described in Test 1. In addition, the mixing amount of the polyorganosiloxane compound and the viscosity at a shear rate of 0.05 s$^{-1}$ were plotted for each particle diameter. FIG. 4 to FIG. 11 show the respective results.

Figure 4:
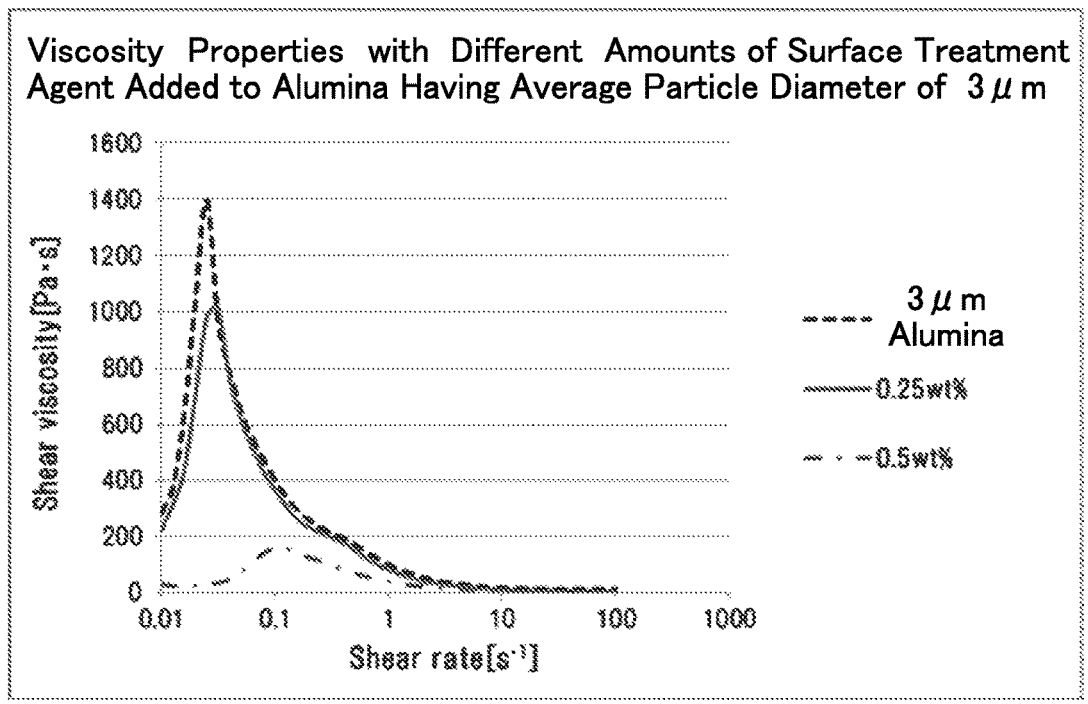
FIG. 4 is a graph showing the shear rate dependence of the viscosity of each test sample in Examples.
Figure 5:
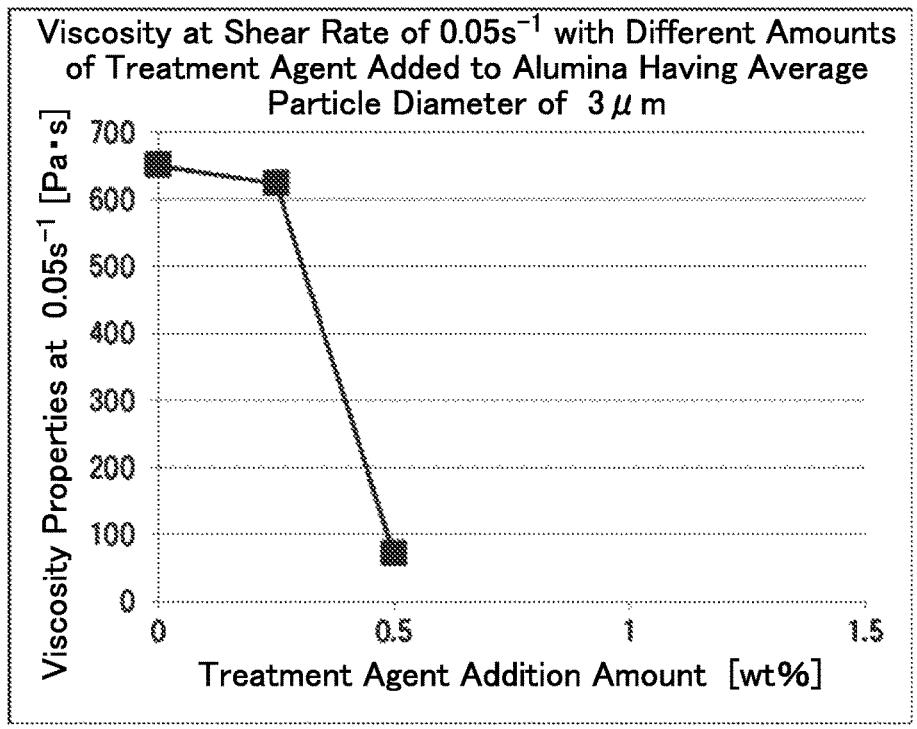
FIG. 5 is a graph showing the treatment agent addition amount dependence of the viscosity of each test sample in Examples.
Figure 6:
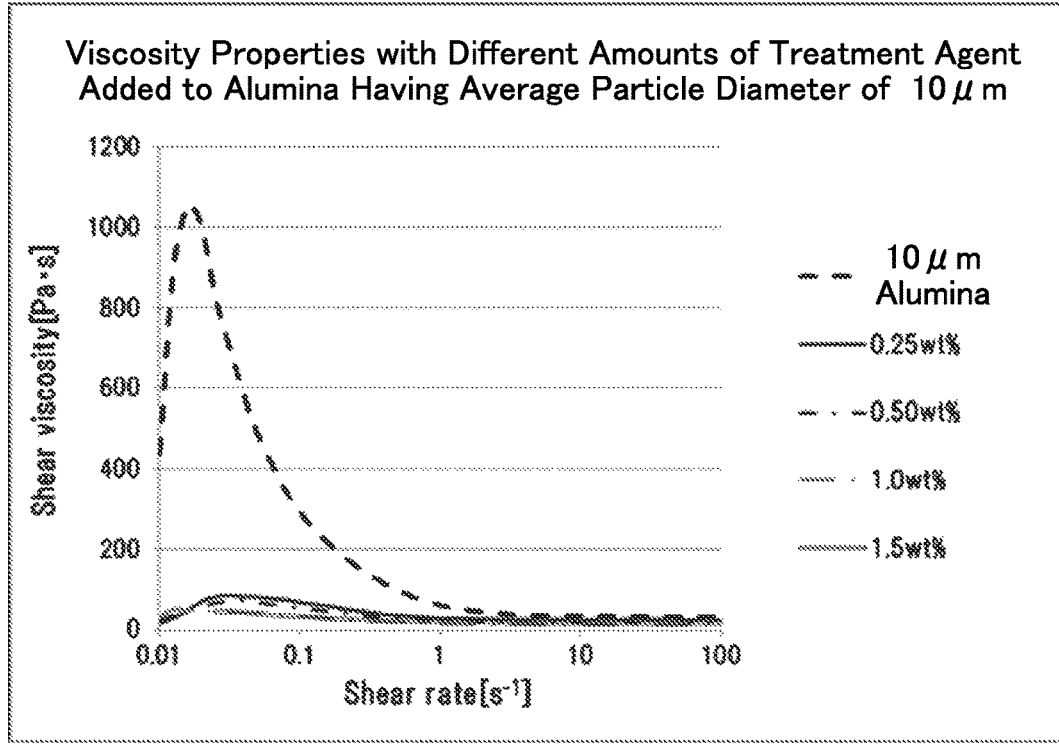
FIG. 6 is a graph showing the shear rate dependence of the viscosity of each test sample in Examples.
Figure 7:
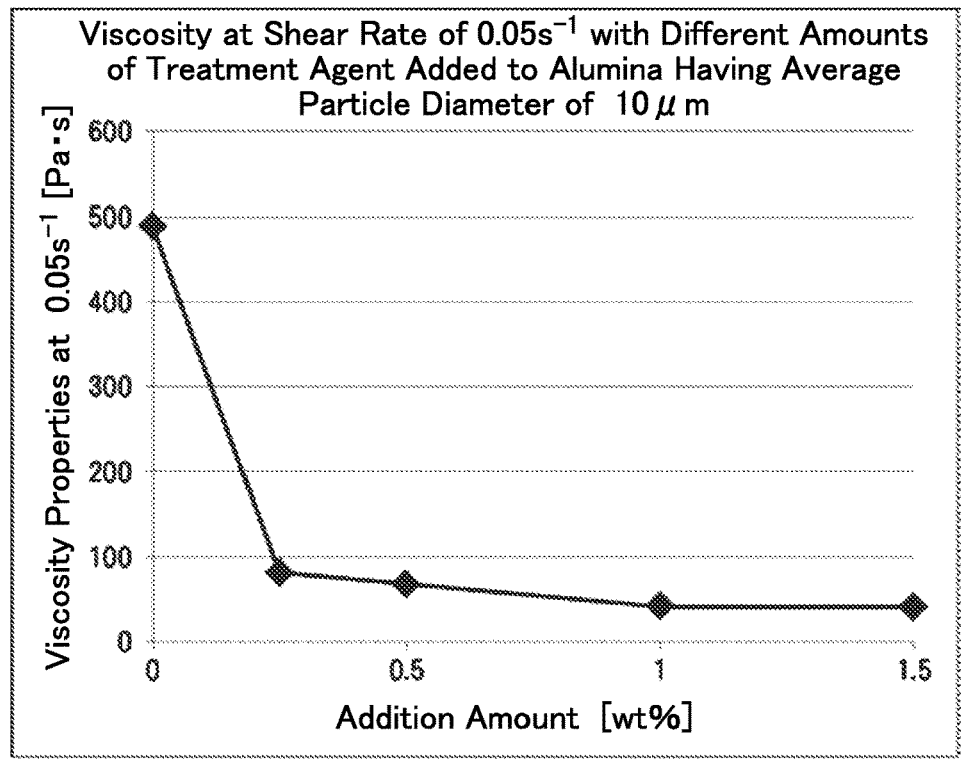
FIG. 7 is a graph showing the treatment agent addition amount dependence of the viscosity of each test sample in Examples.
Figure 8:
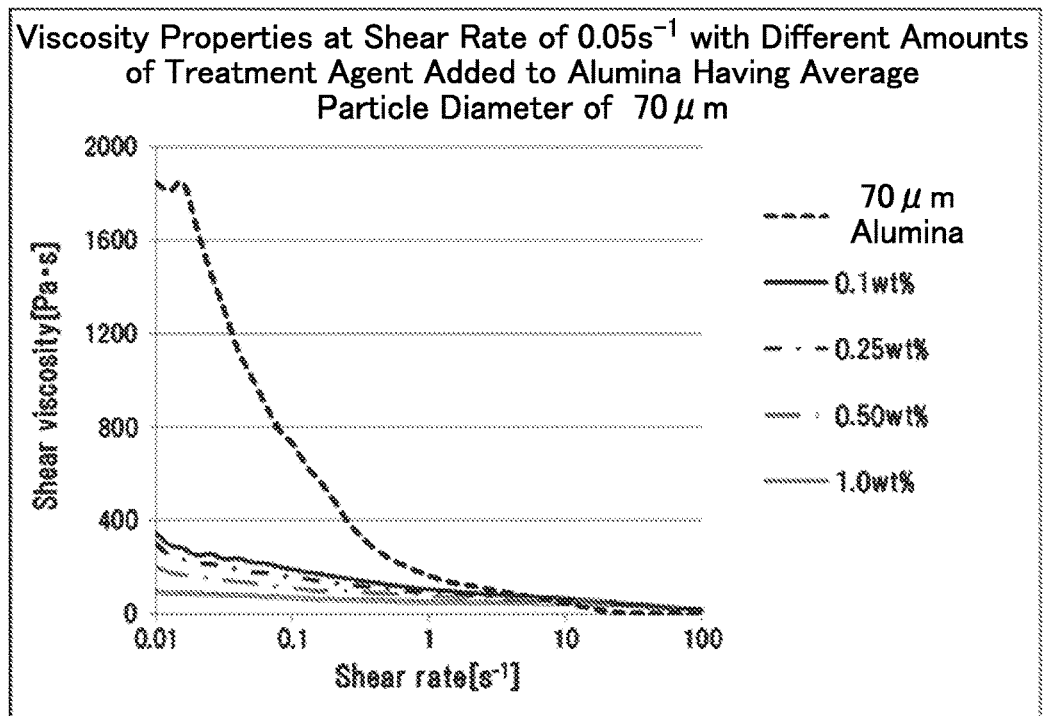
FIG. 8 is a graph showing the shear rate dependence of the viscosity of each test sample in Examples.
Figure 9:
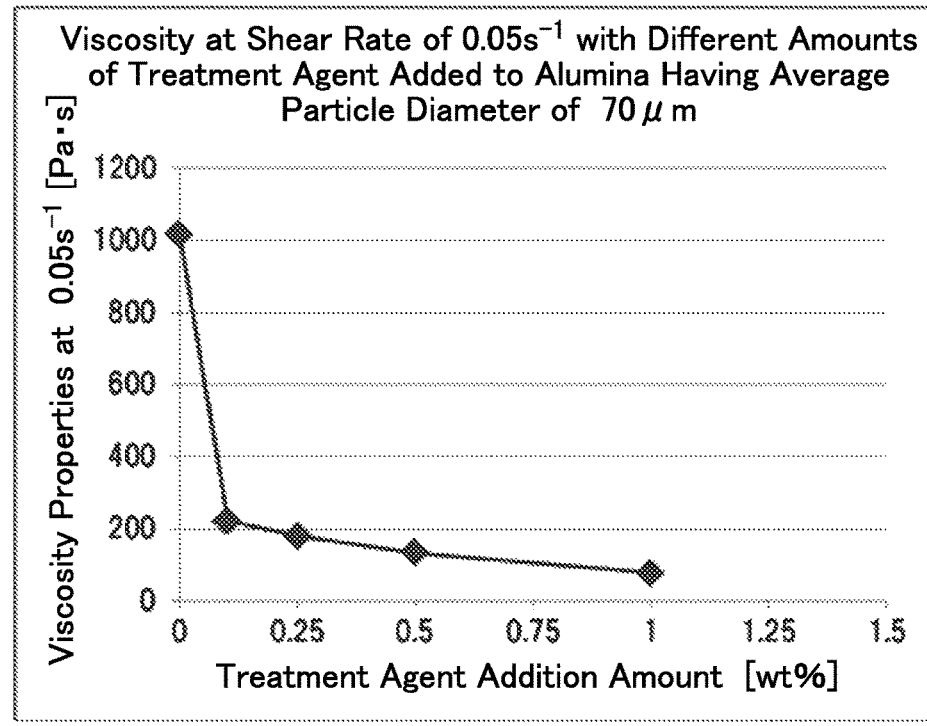
FIG. 9 is a graph showing the treatment agent addition amount dependence of the viscosity of each test sample in Examples.

As is obvious from FIG. 4 and FIG. 5, the viscosity was found to decrease as the mixing amount of the polyorganosiloxane compound increased to 0.25% and 0.5% when the particle diameter was 3 µm. In particular, the viscosity decrease with 0.5% addition was significant as compared to the viscosity decrease with 0.25% addition.

Figure 10:
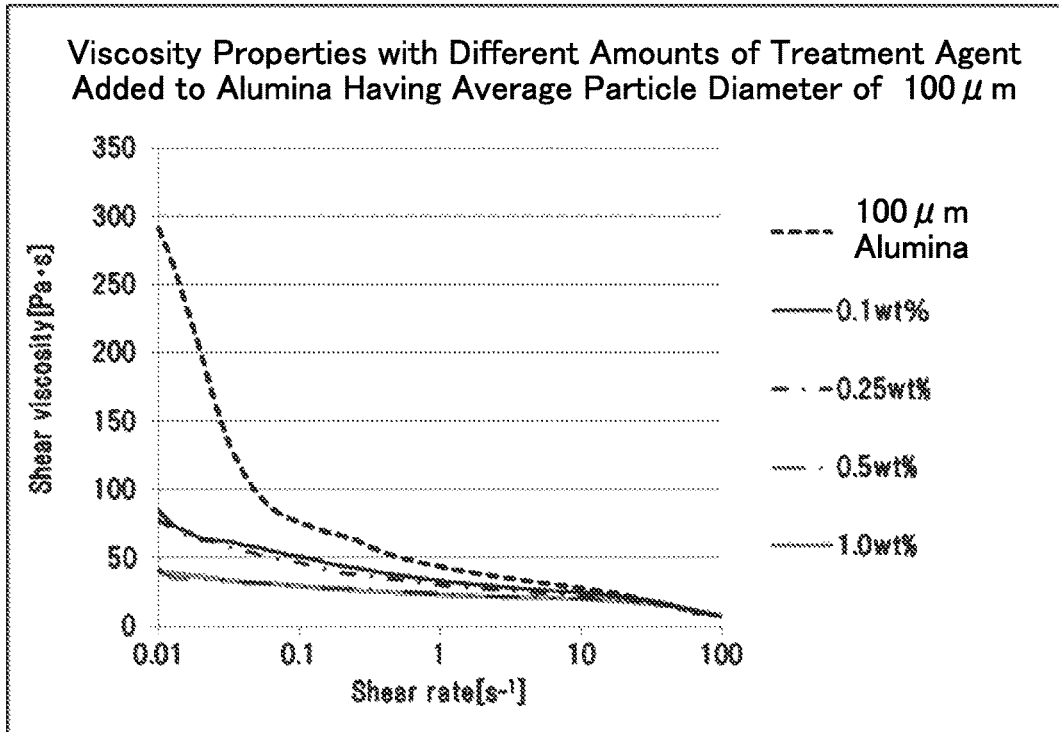
FIG. 10 is a graph showing the shear rate dependence of the viscosity of each test sample in Examples.
Figure 11:
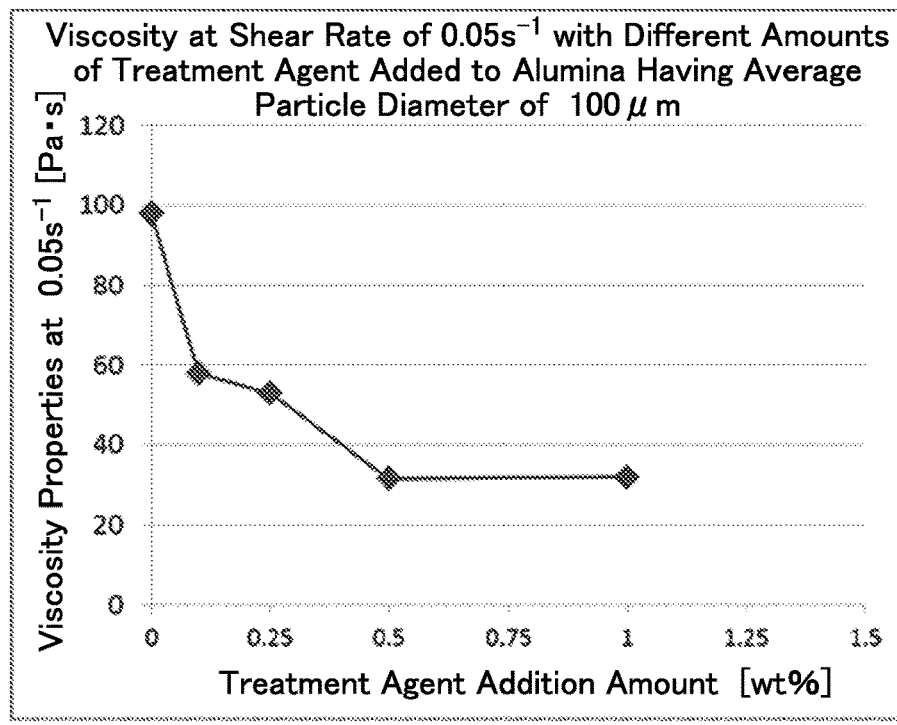
FIG. 11 is a graph showing the treatment agent addition amount dependence of the viscosity of each test sample in Examples.

As is obvious from FIG. 6 and FIG. 7, FIG. 8 and FIG. 9, and FIG. 10 and FIG. 11, when the particle diameter was 10 µm, 70 µm, and 100 µm, the same viscosity was exhibited if the mixing amount of the polyorganosiloxane compound was not less than 0.1%, so that the surface of the metal oxide particle material was found to be sufficiently modified with a mixing amount of about 0.1%. When the particle diameter was 100 µm, the viscosity from 0.1% to 0.5% was decreased as compared to the cases of 0% and 1.0%, and a viscosity decrease effect was suggested to be exhibited with this addition amount (FIG. 10).

(Test 5: Chemical Structure of Surface Treatment Agent)

Test Example 5-1

A resin composition was prepared as a test sample of this test example in the same manner as Test Example 1-1, except that a compound of general formula (1) in which n is 10 was adopted as the polyorganosiloxane compound.

Test Example 5-2

A resin composition was prepared as a test sample of this test example in the same manner as Test Example 1-1 (in general formula (1), n is 30).

Test Example 5-3

A resin composition was prepared as a test sample of this test example in the same manner as Test Example 1-1, except that a compound of general formula (1) in which n is 60 was adopted as the polyorganosiloxane compound.

Test Example 5-4

The test sample of Test Example 1-2 was used as a test sample of this test example.

Test Example 5-5

A resin composition was prepared as a test sample of this test example by the same method as Test Example 1-1, except that $(RO)_3SiO$—$(SiR_2$—$O$—$)_{10}$—$Si(OR)_3$ was used as the surface treatment agent.

Viscosity Measurement

Figure 12:
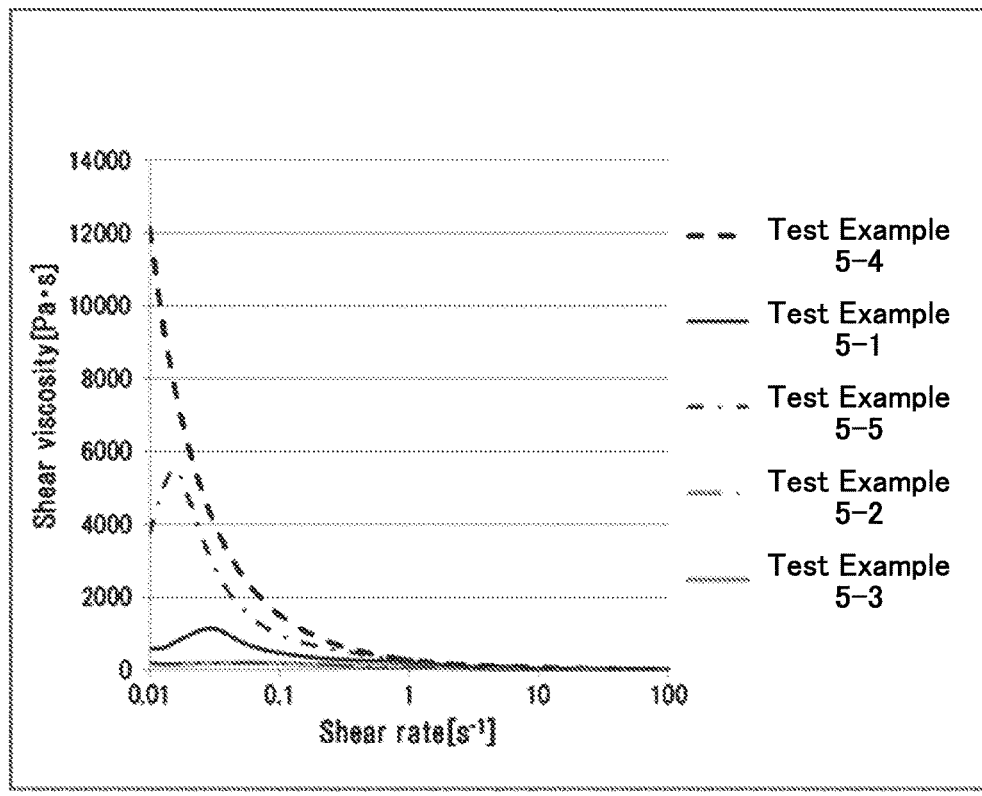
FIG. 12 is a graph showing the shear rate dependence of the viscosity of each test sample in Examples.

The viscosity was measured in the same manner as Test 1. FIG. 12 shows the results. In addition, the value of n and the viscosity at a shear rate of 0.05 s$^{-1}$ were plotted for each test example, and FIG. 13 shows the plots.

Figure 13:
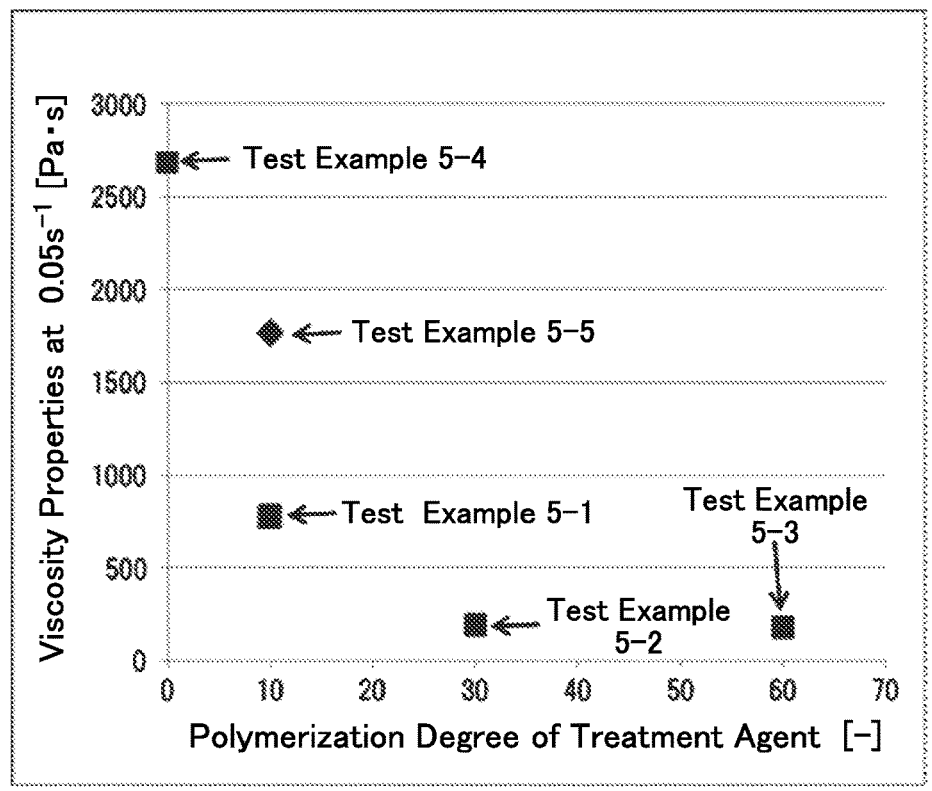
FIG. 13 is a graph showing the polymerization degree (n) dependence of the viscosity of each test sample in Examples.

As is obvious from FIG. 12 and FIG. 13, the viscosity was found to decrease as the value of n increased. In addition, as compared to Test Example 5-1 in which one end of the polyorganosiloxane compound was —$SiMe_3$, the viscosity of the test sample of Test Example 5-5 in which this part was substituted with —$Si(OMe)_3$ was found to be higher by several times. A plurality of particles are speculated to be connected to each other by causing both ends to be —$Si(OMe)_3$, which is reactive, resulting in a viscosity increase due to occurrence of entanglement.

(Test 6: Examination of Surface Treatment Agent and Second Surface Treatment Agent)

The alumina particles adopted in Test Example 1-1 as the metal oxide particle material were reacted in sequential order with a surface treatment agent for the first time (1.5% by mass) and a surface treatment agent for the second time (the treatment amount was calculated, as an amount of alumina to be subjected to two-layer treatment, from the specific surface area of the alumina particles) as described in Table 1, by the method in Test Example 1-1, and were measured for relative permittivity and dielectric loss tangent. Table 1 shows the results. The relative permittivity and the dielectric loss tangent were measured as a relative permittivity and a dielectric loss tangent at 1 GHz using a network analyzer (E5071C, manufactured by Keysight Technologies, Inc.) and a cavity resonator perturbation method. The measurement was performed according to ASTMD2520 (JIS C2565).

TABLE 1

| | Surface treatment agent for first time | Surface treatment agent for second time | Permittivity (F/m) | Dielectric loss tangent |
|---|---|---|---|---|
| Test Example 6-1 | General formula (1) | — | 12.4 | 0.0029 |
| Test Example 6-2 | General formula (1) | Vinylsilane | 12.3 | 0.0031 |
| Test Example 6-3 | Vinylsilane | — | 11.5 | 0.0039 |
| Test Example 6-4 | General formula (1) | Methacrylic silane | 12.4 | 0.0095 |
| Test Example 6-5 | Methacrylic silane | — | 12.0 | 0.0116 |
| Test Example 6-6 | HMDS | — | 12.4 | 0.0146 |
| Test Example 6-7 | Hydrosilyl group-containing silicone | — | 12.4 | 0.0040 |

TABLE 1-continued

| | Surface treatment agent for first time | Surface treatment agent for second time | Permittivity (F/m) | Dielectric loss tangent |
|---|---|---|---|---|
| Test Example 6-8 | — | — | 12.6 | 0.0186 |

As is obvious from Table 1, the permittivity is around 12 F/m for all the test examples, and is sufficiently higher than that of silica (3.7 to 3.9). In addition, the dielectric loss tangents of Test Examples 6-1 to 6-3 and 6-7 were low. Therefore, as a surface treatment agent, the polyorganosiloxane compound of general formula (1) and vinylsilane were found to be preferably used individually or in combination. The polyorganosiloxane compound of general formula (1) was confirmed to have better thermal stability than vinylsilane. From the above, the polyorganosiloxane compound of general formula (1) was found to be a material having a low dielectric loss tangent while maintaining a high permittivity.

(Test 7: Examination of Particle Diameter of Metal Oxide Particle Material)

The permittivity and the dielectric loss tangent of each of alumina particles having volume average particle diameters shown in Table 2 as a metal oxide particle material were measured in the same manner as Test 6. Table 2 shows the results.

Test Examples 7-1 and 7-4 have a purity of 99.8%, Test Examples 7-2 and 7-5 have a purity of 99.9%, and Test Examples 7-3 and 7-6 have a purity of 99.99%. Test Examples 7-7 to 7-11 have a purity of 99.0%.

TABLE 2

| | Volume average particle diameter (μm) | Permittivity (F/m) | Dielectric loss tangent |
|---|---|---|---|
| Test Example 7-1 | 0.2 | 11.7 | 0.0155 |
| Test Example 7-2 | 0.2 | 11.5 | 0.0165 |
| Test Example 7-3 | 0.2 | 11.9 | 0.0169 |
| Test Example 7-4 | 10 | 11.7 | 0.0041 |
| Test Example 7-5 | 10 | 11.4 | 0.0034 |
| Test Example 7-6 | 10 | 12.8 | 0.0089 |
| Test Example 7-7 | 3 | 10.4 | 0.0016 |
| Test Example 7-8 | 10 | 10.9 | 0.0008 |
| Test Example 7-9 | 45 | 10.9 | 0.0005 |
| Test Example 7-10 | 70 | 11.0 | 0.0006 |
| Test Example 7-11 | 100 | 11.2 | 0.0006 |

As is obvious from Table 2, the permittivity and the dielectric loss tangent were found not to be influenced by the purity, from the results of Test examples 7-1 to 7-6. In addition, the dielectric loss tangent was found to increase as the particle diameter decreased. Particles having a smaller particle diameter have a larger specific surface area and the amount of adsorbed water increases proportionally, so that this tendency is considered to be due to the adsorbed water. The rate at which moisture in the air is adsorbed to the particles (taken into the pores) is very high. Even if the adsorbed water is removed by firing the particles at a high temperature of about 800° C., when the particles are taken out into the air, the moisture in the air is immediately adsorbed to the particles. At this time, each dielectric loss tangent was confirmed to be decreased due to the surface treatment with the polyorganosiloxane compound, and this decrease is speculated to be due to adsorption of moisture being suppressed by the polyorganosiloxane compound.

(Test 8)

Test Examples 8-1 to 8-3

The resin compositions of Test Examples 1-1 and 1-2 were used as test samples of Test Examples 8-1 and 8-2, respectively.

A resin composition was obtained as a test sample of Test Example 8-3 by mixing (integrally blending) the metal oxide particle material, the polyorganosiloxane compound, and the resin material at once.

Viscosity Measurement

Figure 14:
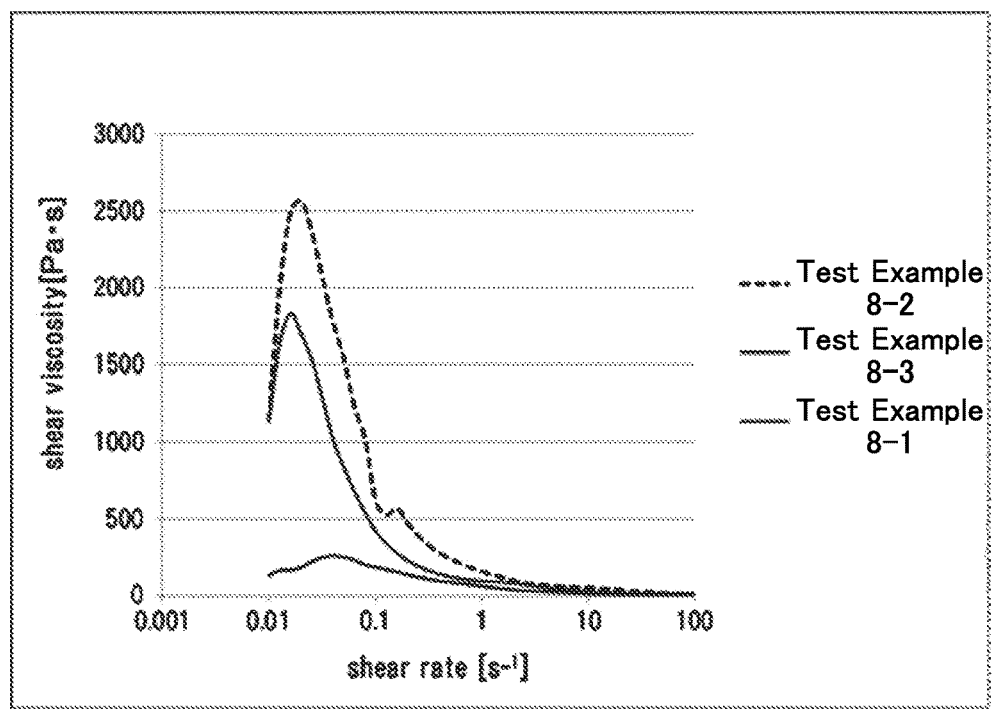
FIG. 14 is a graph showing the shear rate dependence of the viscosity of each test sample in Examples.

The viscosity was measured by the same method as Test 1. FIG. 14 shows the results. As is obvious from FIG. 14, the viscosity was found to be decreased, as compared to a resin composition obtained by mixing at once, by performing a surface treatment with the polyorganosiloxane compound on the metal oxide particle material in advance as in Test Example 8-1.

(Test 9)

Figure 15:
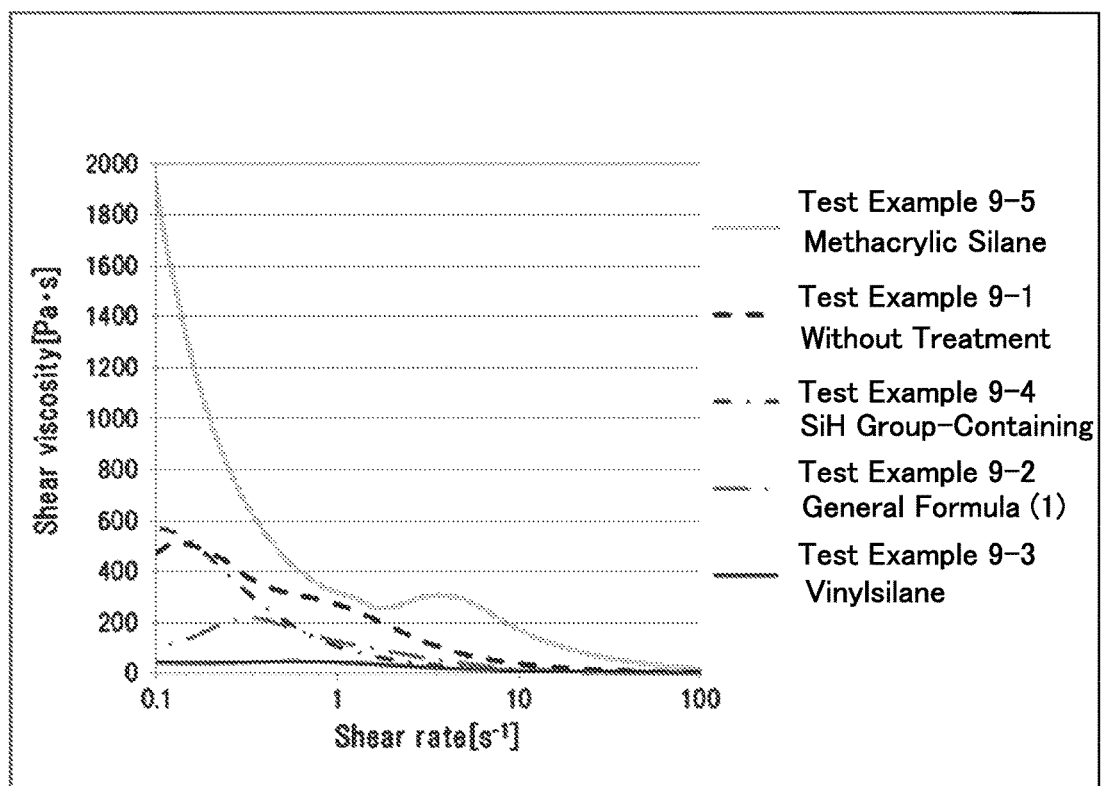
FIG. 15 is a graph showing the shear rate dependence of the viscosity of each test sample in Examples.

The viscosity was measured by the same method as Test 1 with Test Example 6-9 (without surface treatment) as Test Example 9-1, Test Example 6-1 (treated with general formula (1)) as Test Example 9-2, Test Example 6-3 (treated with vinylsilane) as Test Example 9-3, Test Example 6-7 (treated with hydrosilyl group-containing silicone) as Test Example 9-4, and the resin composition of Test Example 6-5 as Test Example 9-5. FIG. 15 shows the results. In addition, FIG. 16 shows the values of viscosity at a shear rate of 0.05 $s^{-1}$ of these test samples.

Figure 16:
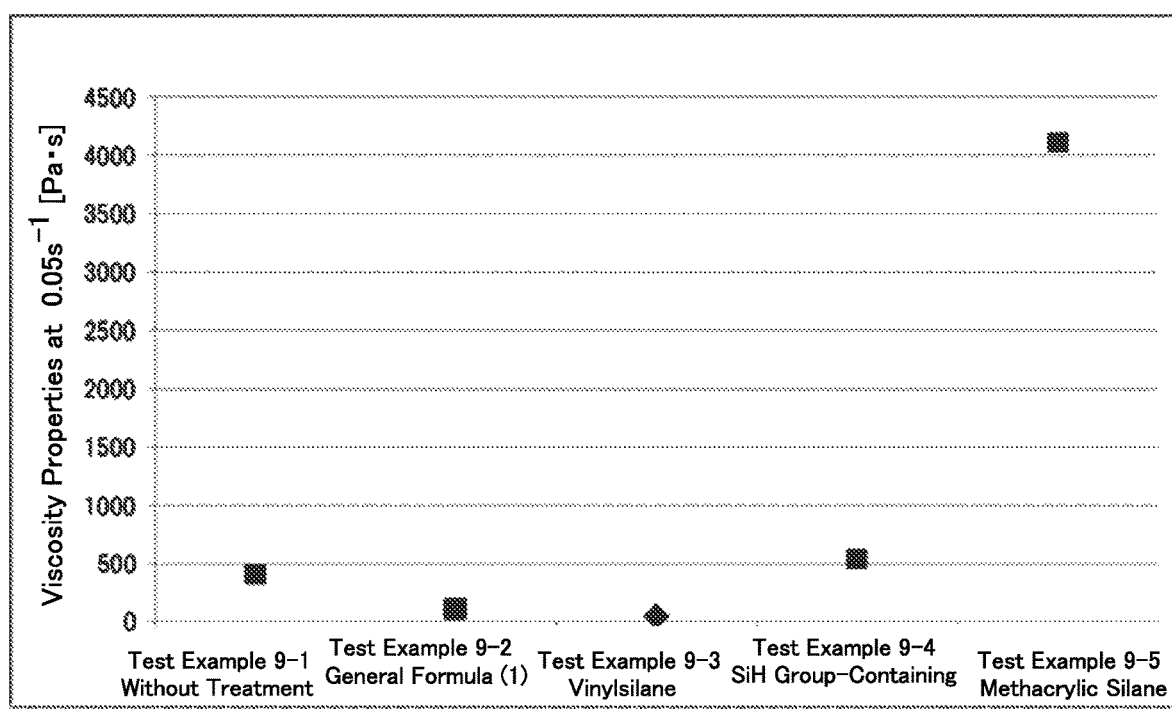
FIG. 16 is a graph showing the viscosity of each test sample in Examples.

As is obvious from FIGS. 15 and 16, the viscosities of the resin compositions of Test Example 9-2 (the polyorganosiloxane compound of general formula (1)) and Test Example 9-3 (vinylsilane) were found to be decreased as compared to that of Test Example 9-1 in which no surface treatment was performed. In addition, the viscosity of Test Example 9-5 (treated with methacrylic silane) increased as compared to that of Test Example 9-1 in which no surface treatment was performed.

The invention claimed is:

1. A surface treated-metal oxide particle material comprising:
   a metal oxide particle material composed of alumina; and
   a polyorganosiloxane compound with which a surface treatment is performed on the metal oxide particle material and which is represented by general formula (1): $(RO)_3SiO—(SiR_2—O—)_n—SiR_3$, wherein in general formula (1), each R is independently an alkyl group having 1 to 4 carbon atoms, and n is not less than 30 and not greater than 60, wherein
   the surface treated-metal oxide particle material is in a state of being mixable with a resin material.

2. The surface treated-metal oxide particle material according to claim 1, wherein
   the metal oxide particle material, which is not subjected to the surface treatment, has a volume average particle diameter of not less than 0.1 μm and not greater than 200 μm, and
   an amount of the polyorganosiloxane compound is not less than 0.05% and not greater than 3.0% based on a mass of the metal oxide particle material.

3. A method for producing the surface treated-metal oxide particle material according to claim 2, the method being for producing particles in a state of being mixable with a resin material, the method comprising:
   mixing a metal oxide particle material and a polyorganosiloxane compound in an amount of not less than 0.05% and not greater than 3.0% based on a mass of the metal oxide particle material, to obtain a mixture, the metal oxide particle material having a volume average particle diameter of not less than 0.1 μm and not greater than 200 μm and composed of alumina, the polyorganosiloxane compound being represented by general formula (1): $(RO)_3SiO—(SiR_2—O—)_n—SiR_3$, wherein in general formula (1), each R is independently an alkyl group having 1 to 4 carbon atoms, and n is not less than 30 and not greater than 60; and
   maintaining the mixture for a surface treatment at a temperature of not lower than 5° C. and not higher than 100° C. for a time of not shorter than 1 hour and not longer than 168 hours to cause a reaction.

4. The method for producing the surface treated-metal oxide particle material according to claim 3, further comprising drying the metal oxide particle material, before the mixing of the metal oxide particle material and the polyorganosiloxane compound, to reduce an amount of a polar solvent contained in the metal oxide particle material.

5. The method for producing the surface treated-metal oxide particle material according to claim 3, further comprising dispersing the polyorganosiloxane compound in a solvent, before the mixing of the metal oxide particle material and the polyorganosiloxane compound.

6. The method for producing the surface treated-metal oxide particle material according to claim 5, wherein the solvent is at least one non-polar solvent selected from the group consisting of hexane, heptane, tetrahydrofuran, toluene, and xylene.

7. The method for producing the surface treated-metal oxide particle material according to claim 3, wherein, in the general formula (1), each R is a methyl group.

8. The surface treated-metal oxide particle material according to claim 2, wherein the surface treated-metal oxide particle material is further subjected to a surface treatment with a second surface treatment agent composed of an organosilazane or a silane compound having a vinyl group or an alkyl group having 1 to 3 carbon atoms.

9. A method for producing the surface treated-metal oxide particle material according to claim 8, the method being for producing particles in a state of being mixable with a resin material, the method comprising:
   mixing a metal oxide particle material and a polyorganosiloxane compound in an amount of not less than 0.05% and not greater than 3.0% based on a mass of the metal oxide particle material, to obtain a mixture, the metal oxide particle material having a volume average particle diameter of not less than 0.1 μm and not greater than 200 μm and composed of alumina, the polyorganosiloxane compound being represented by general formula (1): $(RO)_3SiO—(SiR_2—O—)_n—SiR_3$, wherein in general formula (1), each R is independently an alkyl group having 1 to 4 carbon atoms, and n is not less than 30 and not greater than 60;
   maintaining the mixture for a surface treatment at a temperature of not lower than 5° C. and not higher than 100° C. for a time of not shorter than 1 hour and not longer than 168 hours to cause a reaction; and performing a second surface treatment on the metal oxide particle material with a second surface treatment agent composed of an organosilazane or a silane compound having a vinyl group or an alkyl group having 1 to 3 carbon atoms.

10. A resin composition for an electronic material, comprising:

the surface treated-metal oxide particle material according to claim 8; and a silicone resin material in which the surface treated-metal oxide particle material is dispersed.

11. A resin composition for an electronic material, comprising:

the surface treated-metal oxide particle material according to claim 2; and a silicone resin material in which the surface treated-metal oxide particle material is dispersed.

12. The resin composition for an electronic material according to claim 11, wherein:

the metal oxide particle material has a volume average particle diameter of not less than 10 μm, and particles having a particle diameter that is equal to or less than half the volume average particle diameter are not contained in the metal oxide particle material; and/or the metal oxide particle material has a volume average particle diameter of not greater than 30 μm, and particles having a particle diameter that is equal to or greater than twice the volume average particle diameter are not contained in the metal oxide particle material.

13. The surface treated-metal oxide particle material according to claim 2, wherein:

the metal oxide particle material has a volume average particle diameter of not less than 10 μm, and particles having a particle diameter that is equal to or less than half the volume average particle diameter are not contained in the metal oxide particle material; and/or the metal oxide particle material has a volume average particle diameter of not greater than 30 μm, and particles having a particle diameter that is equal to or greater than twice the volume average particle diameter are not contained in the metal oxide particle material.

14. The surface treated-metal oxide particle material according to claim 1, wherein the surface treated-metal oxide particle material is further subjected to a surface treatment with a second surface treatment agent composed of an organosilazane or a silane compound having a vinyl group or an alkyl group having 1 to 3 carbon atoms.

15. A resin composition for an electronic material, comprising:

the surface treated-metal oxide particle material according to claim 14; and a silicone resin material in which the surface treated-metal oxide particle material is dispersed.

16. A resin composition for an electronic material, comprising:

the surface treated-metal oxide particle material according to claim 1; and a silicone resin material in which the surface treated-metal oxide particle material is dispersed.

17. The resin composition for an electronic material according to claim 16, wherein, in the general formula (1), each R is a methyl group.

18. The surface treated-metal oxide particle material according to claim 1, wherein, in the general formula (1), each R is a methyl group.

* * * * *